United States Patent [19]

Miwa

[11] 4,379,582

[45] Apr. 12, 1983

[54] DEVICE FOR IMPROVING AERODYNAMIC AND SAFETY CHARACTERISTICS OF AUTOMOTIVE VEHICLES

[76] Inventor: Tsutomu Miwa, 3010-8, Sayamagaoka, 1-Chome, Tokorozawa-shi, Saitama 359, Japan

[21] Appl. No.: 194,831

[22] PCT Filed: Feb. 9, 1980

[86] PCT No.: PCT/JP80/00020

§ 371 Date: Oct. 7, 1980

§ 102(e) Date: Oct. 7, 1980

[87] PCT Pub. No.: WO80/01672

PCT Pub. Date: Aug. 21, 1980

[30] Foreign Application Priority Data

Feb. 9, 1979 [JP] Japan .................................. 54-014920
Feb. 14, 1979 [JP] Japan .................................. 54-016774

[51] Int. Cl.³ .............................................. B62D 35/00
[52] U.S. Cl. ...................................... 296/1 S; 296/91; 293/113
[58] Field of Search .................. 296/1 S, 91; 293/113, 293/109, 110; 105/2 A, 2 R

[56] References Cited

U.S. PATENT DOCUMENTS

| | | | |
|---|---|---|---|
| 3,618,998 | 11/1971 | Swauger | 296/1 S |
| 3,776,587 | 12/1973 | Oxlade | 296/1 S |
| 3,791,468 | 2/1974 | Bryan, Jr. | 296/1 S |
| 3,869,166 | 3/1975 | Burst et al. | 296/1 S |
| 3,917,332 | 11/1975 | Puleo | 293/109 |
| 4,006,931 | 2/1977 | Groves | 296/1 S |
| 4,029,350 | 6/1977 | Goupy et al. | 293/110 |
| 4,131,308 | 12/1978 | Holka et al. | 296/1 S |
| 4,159,140 | 6/1979 | Chabot et al. | 296/1 S |

Primary Examiner—Richard A. Bertsch
Attorney, Agent, or Firm—Lowe, King, Price & Becker

[57] ABSTRACT

The device of this invention comprises an air induction passage for directing air upwardly rearwardly and a planar anti-lift member. The device is mounted at the front bumper, near a headlamp, or at rear bumper, or air dam skirts or at the rear of the radiator grille without substantial alterations of the vehicle's general contour lines. An anti-lift thrust is generated by lowering the point at which the front airstream splits up into an upper stream which moves over the upper surface of the vehicle and a lower stream which moves below the bottom of the vehicle, whereby the vehicle's power of adherence to the ground at the front wheels is increased. The vehicle's adherence power at the rear wheels is also increased by directing the airstream flowing below the vehicle bottom surface upwardly rearwardly of the vehicle. The impact absorbing capability of the vehicle is increased by forming the air induction passage with a resilient material to make the air passage act as an impact absorbing member.

6 Claims, 12 Drawing Figures

DEVICE FOR IMPROVING AERODYNAMIC AND SAFETY CHARACTERISTICS OF AUTOMOTIVE VEHICLES

FIELD OF THE INVENTION

The present invention relates to a device for improving the aerodynamic and safety characteristics of automotive vehicles which comprises an air induction passage for producing an airstream directed from a point forward and downward of the vehicle to a rear upward point when the vehicle is moving, and an anti-lift member for generating an anti-lift thrust by the airstream passing through the air induction passage, the induction passage also acting an impact absorbing space to enhance safety of the vehicle upon collision.

BACKGROUND OF THE INVENTION

Due consideration has not hitherto been paid to the aerodynamic performance of automobiles except for racing cars, so that the vehicle has encountered a substantial amount of air resistance when moving at high speeds, resulting in wasteful consumption of fuel. Furthermore, at high vehicle speeds, the vehicle tends to develop a partial vacuum on its upper contoured surface relative to its underside pressure. This results in the vehicle having an upward thrust or lift, causing it to lose adherence to the ground, resulting in instability and poor driving performance. In addition, it is the general tendency that the impact absorbing device such as bumpers has hitherto been treated as an independent unit which is merely fastened to the vehicle body. However, due consideration has not been paid to the method of mounting of such devices to the vehicle body in order to reduce damages under various circumstances. Conventional types of impact absorbing device are thus not satisfactory in operation.

The present invention has, for its object, the provision of a device for improving the aerodynamic and safety performance characteristics of vehicles by reducing vehicular air resistance at high speeds by shaping the vehicle body contour line while maintaining substantially its general contour lines. This prevents the vehicle from losing its adherence to the ground at high speeds, and enhances the impact absorbing characteristics of vehicle by forming a relatively large size impact absorbing space located at the front and rear of vehicle. A further object of the invention is to manufacture such devices at low cost.

SUMMARY OF THE INVENTION

The device according to the present invention includes an air induction passage which directs air upwardly rearwardly from a forward and downward position of vehicle and an anti-lift member mounted in the passage to produce anti-lift thrust on the vehicle. The device is mounted on the vehicle without substantial modification of the vehicle's general contour lines. The air resistance is reduced and the loss of adherence to ground is eliminated by the use of the device of the invention. The air induction passage also serves as an impact absorbing space to enhance the safety characteristics of the vehicle.

BRIEF DESCRIPTION OF THE DRAWINGS

FIGS. 1 to 3 are illustrations of a first embodiment of the present invention, wherein FIG. 1 illustrates a perspective view, FIG. 2 illustrating a cross-sectional explanatory view, and FIG. 3 illustrating a perspective view of an anti-lift member;

DESCRIPTION OF THE PREFERRED EMBODIMENTS

The present invention will now be described by way of example with reference to the accompanying drawings.

Figure 1:
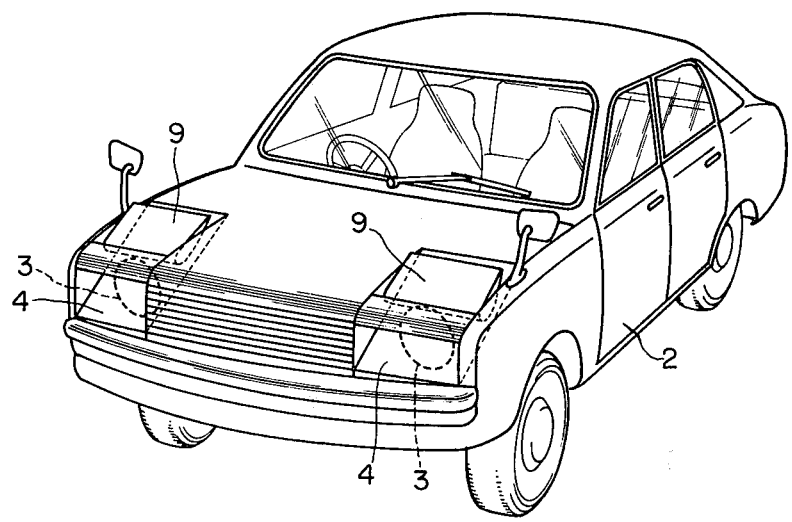
Figure 2:
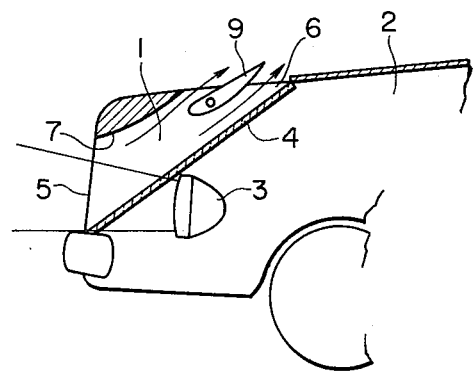

FIGS. 1 and 2 are illustrations of an embodiment of the aerodynamic device which is mounted adjacent to each of the headlamps of an automotive vehicle.

In this illustrative embodiment, each aerodynamic device comprises a tilted light transmissive member 4 which is mounted between side walls formed at the front end of vehicle 2 and extends from a point forward of a headlamp 3 of vehicle 2 to a point above the rearward of headlamp 3. Tilted light transmissive member 4 defines at the front edge an air inlet opening 5 and at the rear an air outlet opening 6 which is flush with the upper surface of vehicle body. The lower part of tilted light transmitting member 4 serves as a headlamp cover through which the headlight is allowed to illuminate objects in front of the vehicle. The device includes an upper member 7 which defines with the tilted member 4 and the side walls an air induction passageway 1 to create a rear-upward air flow through openings 5 and 6 when the vehicle is moving. The outlet opening 6 may be located on or adjacent to the bonnet of the vehicle.

Figure 3:
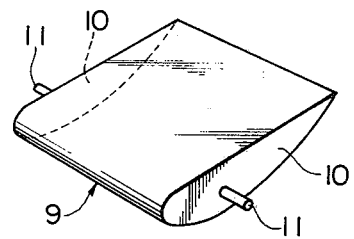

An anti-lift member 9 is pivotally mounted on the upper part of the side walls of the air passageway 1. This anti-lift member 9 is shown in FIG. 3 as comprising, for example, a spoiler having a cross-section which is given a curvature to its lower side to produce an anti-lift force at a point adjacent to pivot pins 11 secured to side plate 10. The anti-lift member 9 is loosely mounted on the pivot pins 11 so that when the vehicle is at a standstill or moving at low speeds the leading edge of spoiler 9 comes into contact with the lower edge of the vehicle hood panel with its trailing edge spaced forward from the rear edge of the deflecting member 4, whereby the outlet opening 6 is partially closed. When the vehicle is moving at high speeds, air that is introduced into passageway 1 creates an upward thrust at the trailing edge of spoiler 9 to cause it to rotate to a tilted, or wide-open position automatically, as illustrated in FIG. 2, without the assistance of any external power, so that an anti-lift thrust is acted on the vehicle 2 as a result of a partial vacuum created at the bottom surface of spoiler 9.

The anti-lift force acted upon the vehicle 2 is enhanced by an additional downward thrust generated by airstream that is directed rearwardly upwardly by the deflecting member 4 due to the larger surface area of member 4 than spoiler 9.

In this way, the aerodynamic device of the present embodiment provides a decrease in lift of vehicle 2 when moving at high speeds by the anti-lift thrust created by spoiler 9 and deflecting member 4. Furthermore, the air passageway 1 allows airstream at the front of vehicle 2, which would otherwise cause a high air pressure in the neighborhood of headlamp 3, to escape rearward, so that it reduces the air resistance of vehicle 2. The air passageway 1 also serves as an energy absorbing space upon front collision of vehicle 2, since the members constituting the passageway 1 are crushed sideways into passageway 1. If the passageway 1 is constituted by resilient members, the shock absorbing effect will be more enhanced. Since this shock absorbing space is provided within the contour of vehicle 2, there is no need for an extra length to be added to vehicle 2 to achieve the same shock absorbing effect as that provided by a bumper which tends to increase the total length of vehicle.

Figure 4:
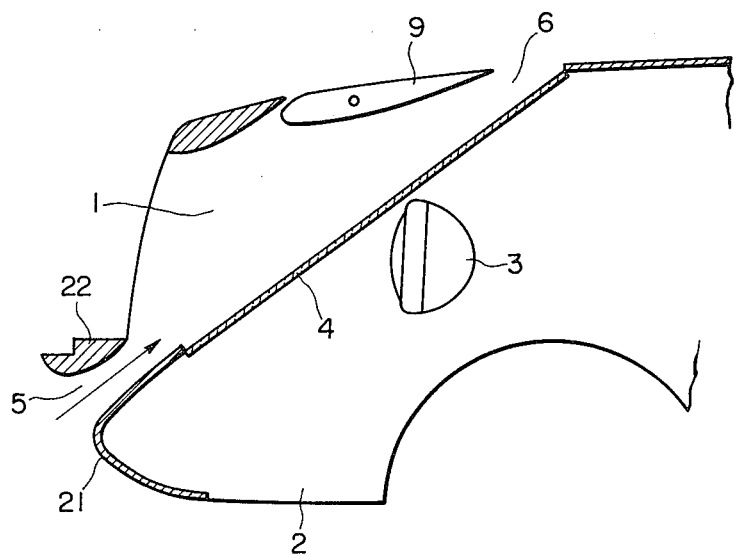
FIG. 4 is an illustration of a second embodiment of the present invention in cross-section.
Figure 5:
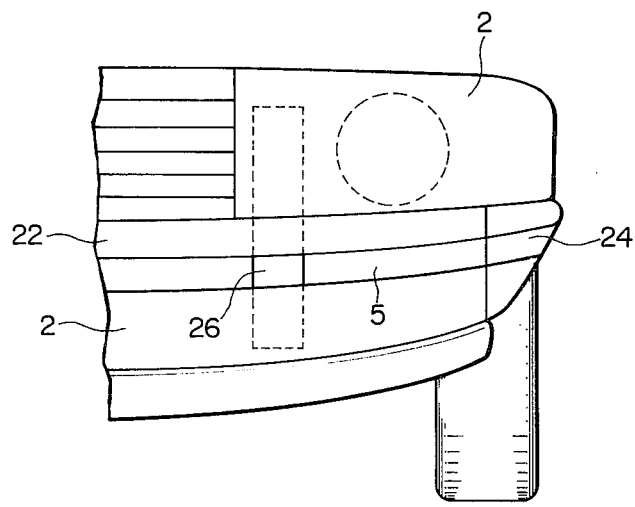
FIG. 5 is an illustration of a front view of the second embodiment.

In another embodiment of the invention illustrated in FIGS. 4 and 5, the inlet opening 5 is formed by a space between a main front bumper 21 and an anti-lift bumper 22 mounted upwardly forwardly of bumper 21. This main front bumper 21 is mounted at a position lower than the usual position of conventional bumpers. The bumpers 21 and 22 are fastened together by vertically extending side members 24, 24 and secured to the vehicle frame by means of braces 26, 26. The bottom surface of the anti-lift bumper 22 is convexed to produce an anti-lift thrust in addition to the anti-lift thrust created by the deflecting member 4 to which airstream is directed through the inlet opening 5. The front edge of this bumper 22 is formed of a resilient material.

As in the previous embodiment, the embodiment of FIGS. 4 and 5 provides anti-lift thrust due to the action of bumper 22 and air passageway 1 to prevent the vehicle from lifting when moving at high speeds and also provides reduction of air resistance at the front of vehicle. In addition to the shock absorbing action provided by the air passageway 1, the shock absorbing characteristic is enhanced by an increased front surface area formed by the upper and lower bumpers 22 and 21 and the reinforcing members 24, 24 and 26, 26. Since the main front bumper 21 is mounted at a somewhat lower position than conventional bumpers, it is possible to reduce the amount of impact on a pedestrian upon collision. Since the front edge of upper bumper 22 is formed of a resilient material and projecting to a point forward of the lower, main bumper 21, the front collision will cause the resilient edge to bend considerably downward to cover the upper surface of the main bumper 21 providing a cushioning effect to thereby reduce damages.

When the vehicle is moving at high speeds, the upper bumper 22 tends to lower its resilient front edge to a slightly downward position, so that the point at which the front airstream splits into upper and lower streams is somewhat lowered. This front bumper can be fastened to the outer mounting plate of vehicle to which the conventional front bumper is fastened, so that the total length of the vehicle can be somewhat reduced with the resultant decrease in production cost and in repairing cost incurred to the outer mounting plate which is often impaired. In addition, the reinforcing members 24, 24, 26, 26 may be constructed by tubings of high strength in a large framed structure having a wide front area and a sufficient thickness in the fore-and-aft direction, which framed structure is covered by a resilient soft material, so that it serves the dual purposes of providing the side walls of passageway 1 and a shock absorbing pad.

Figure 6:
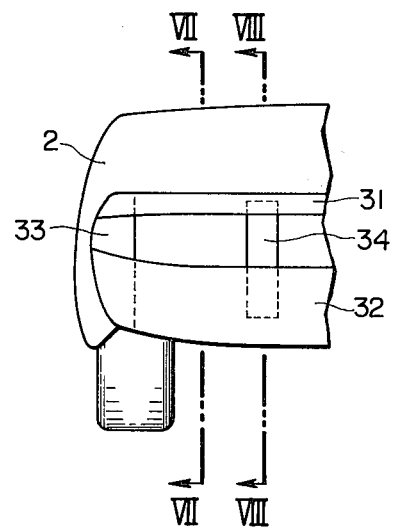
FIG. 6 is an illustration of a front view of a third embodiment of this invention.
Figure 7:
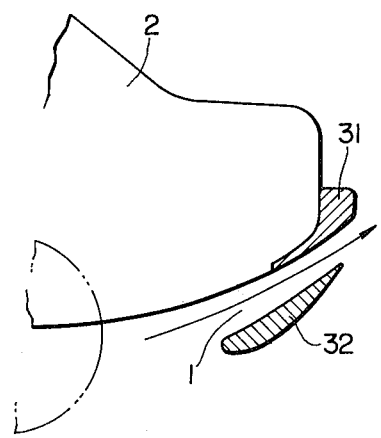
FIG. 7 is an illustration of a cross-sectional view taken along the line VII—VII of FIG. 6.
Figure 8:
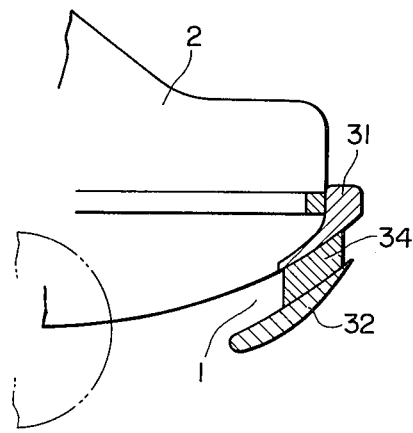
FIG. 8 is an illustration of a cross-sectional view taken along the line VIII—VIII of FIG. 6.

As illustrated in FIGS. 6, 7 and 8, the air induction passage 1 may be formed by a space between a main rear bumper 31 at the vehicle rear and an anti-lift bumper 32 mounted below and forward of the main rear bumper 31. Reinforcing members 33, 33, 34, 34 serve as the side walls of the passage 1 as well as an impact absorbing member.

The rear main bumper 31 is mounted at a position higher than conventional rear bumpers, so that it is not necessary to bend the rear frame of the vehicle downward; it can be simply mounted on a straight edge of the rear frame. The main rear bumper 31 and the anti-lift bumper 32 are fastened together by the reinforcing members 33, 33 downwardly extending from the opposite ends of bumper 31 and the reinforcing members 34, 34 secured to the rear frame of the vehicle, the vertically extending reinforcing members 33, 33, 34, 34 being formed of a resilient material of sufficient cross-sectional dimensions. The air passageway 1 thus directs air upwardly rearwardly of the vehicle 2. The anti-lift bumper 32 thus extends from the rear of vehicle 2 to the bottom surface thereof to serve as an outer rear panel, so that the length of vehicle 2 is slightly short as compared with the length of conventional vehicle in which the rear bumper is mounted at a distance from the rear panel. The anti-lift bumper 32 is preferably formed of an impact absorbing resilient material and shaped so that its cross-section has the configuration of a spoiler so as to create an anti-lift thrust.

The embodiment of FIGS. 6, 7 and 8 thus provides an anti-lift effect on the rear of vehicle 2 when moving at high speeds to prevent the vehicle rear from lifting from the ground. Conventional automotive vehicles are usually pulled by a drag generated by the combined effect of a compressed air at the vehicle front and a reduced air pressure at the vehicle rear. Whereas, the present embodiment eliminates this drag by directing airstream below the bottom surface of vehicle 2 rearwardly upwardly by the air passageway 1 and the anti-lift bumper 32 which combine to increase the air density at the vehicle rear and provide a rearwardly directed laminar airstream. For the same reasons as described in connection with the second embodiment of the invention, the reinforcing members 33, 34, the main rear bumper 31 and the shock absorbing space of air passageway 1 combine to act as an enhanced impact absorbing action. If the forward edge of the anti-lift member 32 is formed of a soft resilient material, a greater air pressure will cause it to bend downward to increase the amount of air taken into the air passageway 1, thereby increasing the anti-lift effect at the rear of the vehicle 2.

The rear main bumper is mounted at a position higher than the front main bumper so that a rigid connection is ensured with respect to the vehicle frame. This permits elimination of a panel which is conventionally provided at a position lower than the rear bumper. By constructing the front and rear aerodynamic devices of the invention with a combination of resilient and hard materials to provide a wide impact receiving area at the front and rear of the vehicle 2, the aerodynamic performance characteristics and the safety assurance characteristics of the automotive vehicle can be improved, while at the same time attaining a reduced total length of the vehicle and reduced maintenance and fuel costs. The reduction of such costs will be greater than the cost which is incurred by the adoption of the aerodynamic devices of the present invention.

Figure 9:
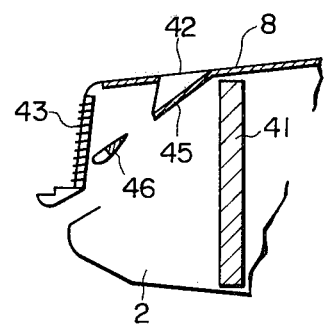
FIG. 9 is an illustration of a cross-sectional view of a fourth embodiment of this invention.
Figure 10:
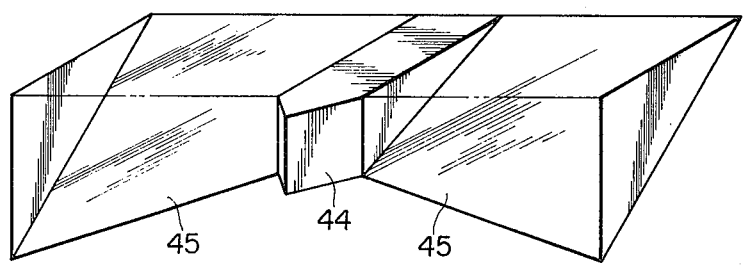
FIG. 10 is an illustration of a perspective view of the tilted member of FIG. 9.

A fourth embodiment of the present invention is illustrated in FIGS. 9 and 10. In this embodiment, the air passageway 1 is formed by two air outlet openings 42, 42 and two upwardly rearwardly extending members 45 and 45 fastened together by a strengthening member 44 between them, all of which are mounted under the bonnet 8 at a point forward of the radiator 41, so that air taken through the radiator grille 43 at the front of vehicle 2 is directed upwardly toward the rear of the vehicle. At a point forward of the tilted member 45 and rearward of the radiator grille 43 is supported an anti-lift member 46 formed of a resilient material extending transverse between side walls that form part of the passageway 1.

A Because of the resiliency of the anti-lift member 46, its leading edge is bent downward slightly by a strong air pressure at high vehicle speeds and returns to the original position at low vehicle speeds. Thus, most of the air taken through the radiator grille 43 at vehicle high speeds is directed by the anti-lift member 46 toward the tilted member 45. At low vehicle speeds, the anti-lift member 46 does not cause its leading edge to bend down, so that most of the taken air at grille 43 is allowed to impinge on the radiator 41. At high vehicle speeds the radiator 41 is considered to be sufficiently cooled off if it receives air that passes through an opening having an area much smaller than the front surface area of the radiator, the cooling performance of the aerodynamic device of the present embodiment is ensured while at the same time providing a reduction of air resistance by directing part of the taken air to the outlet openings 42, 42 on the bonnet 8 and also providing an anti-lift effect on the vehicle 2 by the tilted members 45 and the anti-lift member 46. The same impact absorbing effect is ensured by the air passageway 1 and the anti-lift member 46 as in the previous embodiments.

Figure 11:
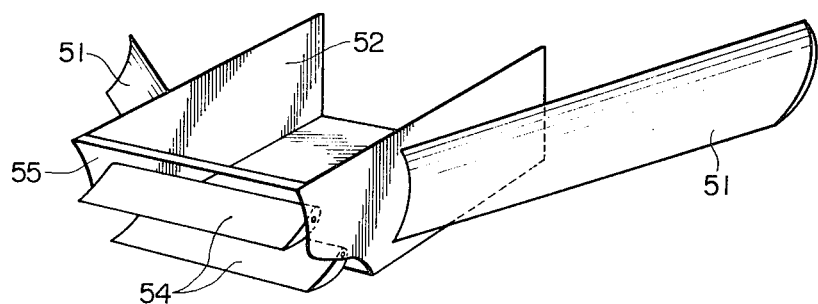
FIG. 11 is an illustration of the air induction passage of a fifth embodiment of this invention.
Figure 12:
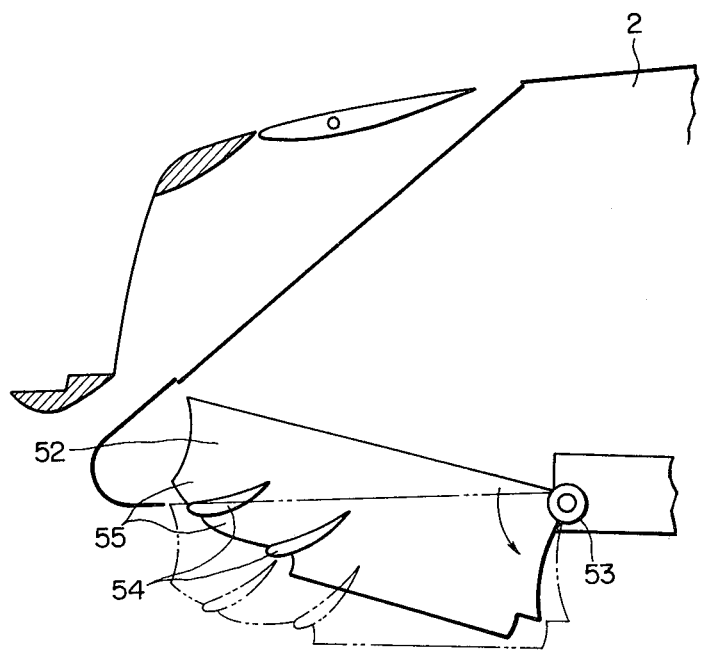
FIG. 12 is an illustration of an explanatory cross-sectional view of the fifth embodiment.

FIGS. 11 and 12 are illustrations of a fifth embodiment of the present invention. In this embodiment, the air passageway 1 is formed by a space between two air dam skirts 51, 51 mounted at the front and below the bottom surface of vehicle 2 and is formed integrally with these skirts.

These air dam skirts 51, 51 are each mounted pivotally at their rear portions on the vehicle frame near front wheels and biased by means of springs 53 so that their front ends are in a raised position. Air is introduced into an air passageway 52 from front of the vehicle 2 through an inlet opening 55 and passed toward the radiator. In this inlet opening 55 is fixedly secured a pair of anti-lift members 54, 54.

When the vehicle is running at high speeds, an anti-lift thrust produced by the members 54, 54 causes the air dam skirts 51, 51 and the air passageway 52 to swing down against the force of springs 53 to a downward position. Therefore, the most of air which move past below the bottom of vehicle are directed sideways by the air dam skirts 51, 51, thereby reducing the amount of upward thrust on the vehicle. Since these pivoted air dam skirts 51, 51 and the air passageway 52 are separated from the fenders and the bumper, they can be formed of a resilient material such as black synthetic resin or synthetic rubber with no paint coat thereon so that they provide impact absorbing characteristic at a low cost.

INDUSTRIAL UTILITY AND APPLICATIONS

As described above, the aerodynamic device of the present invention assures fuel savings by the reduced air resistance offered to the vehicle, stability at high speed driving by the increased adherence to the ground with the use of anti-lift thrust, and reduction of repair cost and damages by the improved impact absorbing capability upon frontal collision.

I claim:

1. A device for improving the aerodynamic and safety characteristics of an automotive vehicle, comprising an impact absorbing member defining an air induction passage extending longitudinally of the vehicle for directing air upwardly and rearwardly of the vehicle from a point forward thereof and through a passage outlet during vehicle movement, and an anti-lift member formed of a material being mounted in said air induction passage, said anti-lift member having a trailing edge positioned higher than a leading edge thereof, said impact absorbing member and anti-lift member being located below the level of a vehicle hood.

2. A device as claimed in claim 1, wherein said air induction passage is formed by a space between an upwardly rearwardly tilted surface of a main front bumper mounted at the front of the vehicle and an anti-lift producing surface of an anti-lift bumper located upwardly and forwardly of said main front bumper, said anti-lift bumper being mounted at the front end of said vehicle by removing part of the vehicle front portion and the front fender panel of the vehicle, and wherein said anti-lift member comprises said anti-lift bumper and an anti-lift plate mounted adjacent the rear edge of said air induction passage.

3. A device for improving the aerodynamic and safety characteristics of an automotive vehicle, comprising an impact absorbing member defining an air induction passage extending longitudinally of the vehicle for directing air upwardly and rearwardly of the vehicle from a point forward thereof during vehicle movement, and an anti-lift member formed of a material being mounted in said air induction passage, said anti-lift member having a trailing edge positioned higher than a leading edge thereof, wherein said air induction passage is formed along an upper surface of an upwardly and rearwardly tilted light transmissive member mounted to cover a headlamp of said vehicle, and wherein said anti-lift member is pivotally mounted adjacent to an opening at the rear edge of said tilted light transmissive member.

4. A device for improving the aerodynamic and safety characteristics of an automotive vehicle, comprising an impact absorbing member defining an air induction passage extending longitudinally of the vehicle for directing air upwardly and rearwardly of the vehicle from a point forward thereof during vehicle movement, and an anti-lift member formed of a material being mounted in said air induction passage, said anti-lift member having a trailing edge positioned higher than a leading edge thereof, wherein said air induction passage is formed by a space between a main rear bumper mounted at the rear of the vehicle and an anti-lift bumper mounted below said main rear bumper, wherein said anti-lift bumper is formed of a resilient material and having a front edge located forwardly and downwardly of said main rear bumper below the vehicle bottom surface, said anti-lift bumper being located by removing part of a panel of a rear fender of the vehicle.

5. A device for improving the aerodynamic and safety characteristics of an automotive vehicle, comprising an impact absorbing member defining an air induction passage extending longitudinally of the vehicle for directing air upwardly and rearwardly of the vehicle from a point forward thereof during vehicle movement, and an anti-lift member formed of a material being mounted in said air induction passage, said anti-lift member having a trailing edge positioned higher than a leading edge thereof, wherein said air induction passage is formed by an upwardly and rearwardly tilted member mounted below an opening in front of a vehicle radiator, wherein said anti-lift member is mounted between side walls rearward of a radiator grille to extend to align the surface of the tilted member so that the front edge of the anti-lift member projects forwardly and downwardly, said front edge of the anti-lift member being formed of a resilient material.

6. A device for improving the aerodynamic and safety characteristics of an automotive vehicle, comprising an impact absorbing member defining an air induction passage extending longitudinally of the vehicle for directing air upwardly and rearwardly of the vehicle from a point forward thereof during vehicle movement, and an anti-lift member formed of a material being mounted in said air induction passage, said anti-lift member having a trailing edge positioned higher than a leading edge thereof, wherein said air induction passage is secured to air dam skirts at a front end portion of the vehicle pivotally to the vehicle frame adjacent vehicle front wheels, said air dam skirts being movable into a downward tilted position by an airstream directed rearwardly from the vehicle front to the vehicle radiator enabling the air dam skirts to be exposed to an airstream passing below the vehicle bottom surface, wherein said anti-lift member is mounted at the front of the inlet opening of said air induction passage.

* * * * *